WALTER W MCINTOSH
JOHN MOZIEK   INVENTORS.
OSCAR L. SMITH
BY
Carl G. Ries

WALTER W. McINTOSH
JOHN MOZIEK
OSCAR L. SMITH
INVENTOR.

BY
Carl G. Ries

United States Patent Office 2,771,636
Patented Nov. 27, 1956

2,771,636

APPARATUS FOR EXTRUDING THERMOPLASTIC MATERIAL

Walter W. McIntosh, Indian Orchard, and John Moziek and Oscar L. Smith, Springfield, Mass., assignors to Monsanto Chemical Company, St. Louis, Mo., a corporation of Delaware Application July 22, 1953, Serial No. 369,594

4 Claims. (Cl. 18—12)

This invention relates to apparatus for the continuous extrusion of thermoplastic materials. More particularly, this invention relates to an extruder having mounted thereon a breaker-plate assembly that can be replaced without interrupting continuous extrusion operations.

Conventional extruders for thermoplastic materials comprise, generally, an elongate hollow casing provided with heating means and a driven rotatable screw mounted in the casing to force thermoplastic material therethrough. The discharge end of the casing is normally closed with a separate unit or "head" that is removably fixed to the body of the casing. A die is fixed to the head for shaping the thermoplastic material.

In operation, the thermoplastic material is usually fed to the extruder in a solid granular condition alone or in physical admixture with plasticizers, colorants, fillers, etc. As the thermoplastic material is forced through the casing by the screw it is heated to a plastic condition and, while plastic, is colloided and blended with such additives as may be present in order to form a homogeneous composition.

It is common practice to mount a breaker-plate assembly intermediate the screw and the die in order to build up back pressure in the casing and in order to remove impurities from the thermoplastic material being extruded. A breaker plate normally comprises a metal plate provided with a plurality of openings through which the thermoplastic material flows. The size of the openings will determine the resistance to flow and hence, the amount of back pressure that is built up in the casing. It is conventional practice to provide a breaker plate having comparatively large openings which provide relatively little resistance to flow and to use one or more screens mounted on the rear face of the breaker plate to provide for the desired increase in back pressure. When screens are used, back pressure can be controlled with reasonable accuracy by varying the number of screens, the mesh of the screens or both. Such screens serve an additional function in removing impurities from the thermoplastic material being extruded. The impurities are retained on the screens however and this necessitates rather frequent replacement of clogged screens.

Because of the high pressures generated within the casing, the teaching of the prior art has been to mount the breaker-plate assembly in the interior of the extruder in a recess milled in the inner surface of the casing or head. With this construction it is necessary to interrupt extrusion operations and remove the head in order to gain access to the interior of the extruder to install or replace a breaker-plate assembly. When continuous extrusion operations are interrupted, thermoplastic material in the casing is frequently overheated and decomposed. As a result, it is preferable to avoid the interruption of continuous extrusion operations whenever possible.

Accordingly, an object of the present invention is the provision of an extruder for thermoplastic materials including a breaker-plate assembly that can be installed or replaced without interrupting continuous extrusion operations.

Another object is the provision of an extruder for thermoplastic materials including a breaker-plate assembly that can be removed and replaced by another breaker-plate assembly of similar construction without interrupting continuous extrusion operations.

A further object is the provision of an extruder for thermoplastic materials including means for varying the pressure generated on the thermoplastic material without interrupting continuous extrusion operations.

The manner in which these and other objects are attained will be apparent from the following description and the accompanying drawings illustrating a preferred embodiment of the invention wherein.

Figure 1:
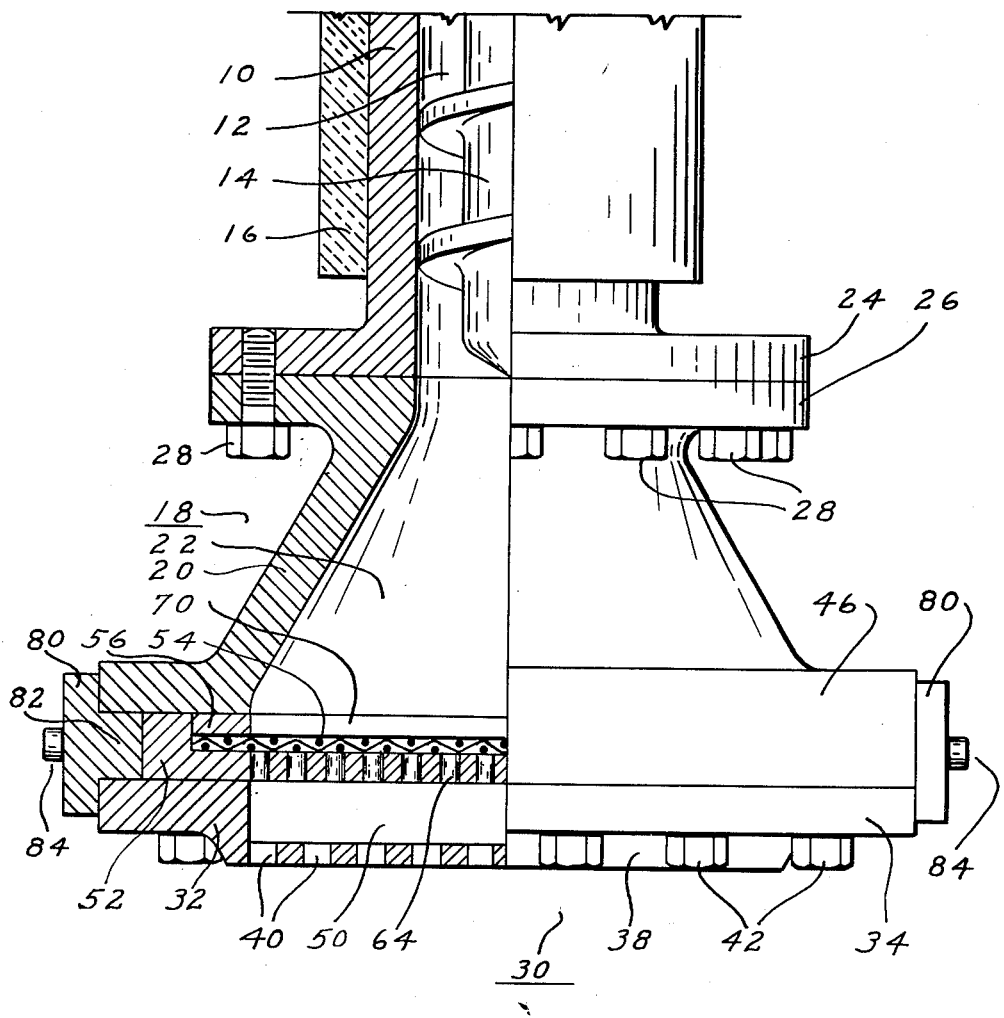
Fig. 1 is a top plan view, partly in section, of the discharge end of an extruder.
Figure 2:
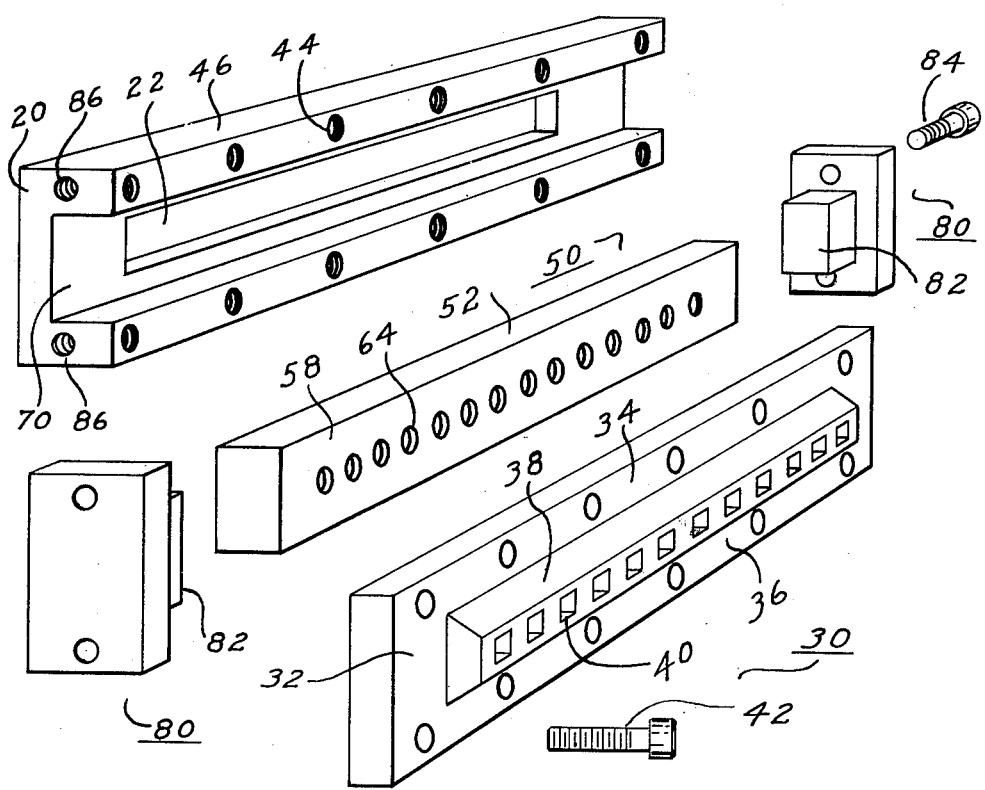
Fig. 2 is an exploded perspective view of the front end of the extruder shown in Fig. 1.

Turning now to the drawings and especially to Figs. 1 and 2, there is schematically shown the discharge end of an extruder including a casing 10 defining a bore 12 of circular cross-section in which a screw 14 of any suitable construction is rotatably mounted. Any suitable means is provided for heating thermoplastic material in the bore 12 such as, for example, an insulated electric heating coil 16 surrounding the casing 10. A casing-closure member or "head" 18 and a die 30 of any suitable construction are fixed to the discharge end of the casing 10, the illustrated head 18 and die 30 being specifically designed for the continuous extrusion of a plurality of strands of thermoplastic material. In accordance with this construction, the head 18 comprises a wall 20 defining a chamber 22 which, in effect, constitutes an extension of the bore 12. The chamber 22 is of progressively changing cross-section, being of circular cross-section at the plane of abutment with the casing 10 and of rectangular cross-section at the plane of abutment with the die 30. The head 18 is fixed to the end of the casing 10 by any suitable means, this being conveniently accomplished by providing a flange 24 on the end of the casing 10 to which a similar flange 26 on the inlet end of the head 18 is fixed by means of a plurality of screws or bolts 28.

The illustrated die 30 comprises a base portion 32 provided with flanges 34 and 36 and a discharge portion 38 provided with a plurality of rectangular openings 40 for the continuous extrusion of a plurality of strands of thermoplastic material. Although any suitable means may be employed to fix the die 30 to the head 18, this is preferably accomplished by using a plurality of screws or bolts 42 which pass through suitable openings in the flanges 34 and 36 and are threaded in taps 44 in a flange 46 on the discharge end of the head 18.

In accordance with the present invention, a breaker-plate assembly 50 for building up back-pressure in the chamber 22 and the bore 12 and for screening impurities and uncolloided agglomerates from the thermoplastic material is positioned in a slot 70. In the illustrated embodiment of the invention, the breaker-plate assembly is shown adjacent the die 30 in the chamber 22. However, the breaker-plate assembly can be positioned at any point intermediate the end of the screw 14 and the die 30.

The slot 70 should extend completely through the side of the extruder, should be of uniform cross-section throughout and should perpendicularly intersect the entire peripheral edge of the bore at the zone of intersection therewith. The slot 70 can be of any desired cross-sectional shape, such as circular, elliptical, square, rectangular, etc. In the illustrated embodiment of the invention, the slot 70 is milled in the discharge end of the head 18 and is of rectangular cross-section. In this showing, the slot 70 is centered with respect to the chamber 22 and perpendicularly intersects the entire peripheral edge thereof, being wide enough to provide a margin surrounding the chamber 22. It will be apparent that the width of the slot 70 could be equal to the width of the chamber 22, in which case only end margins would be provided, or that the slot 70 could completely intersect the wall 20, in which case there would be no direct mechanical interconnection between the head 18 and the die 30.

The breaker-plate assembly 50 should have the same cross-sectional configuration as the slot 70. The overall length of the breaker-plate assembly 50 should be greater than the width of the chamber 22 in the direction of the slot so that marginal end portions are provided for engagement with the walls of the slot 70. Since the breaker-plate assembly 50 has the same cross-sectional configuration as the slot 70, when the slot 70 is of a width greater than the width of the chamber 22, as shown in the drawings, the width of the breaker-plate assembly 50 will likewise be greater and the marginal portion thereof will completely surround the chamber 22. The portion of the breaker plate assembly 50 intersecting the chamber 22 should be perforated to permit the passage of thermoplastic material therethrough.

Figure 3:
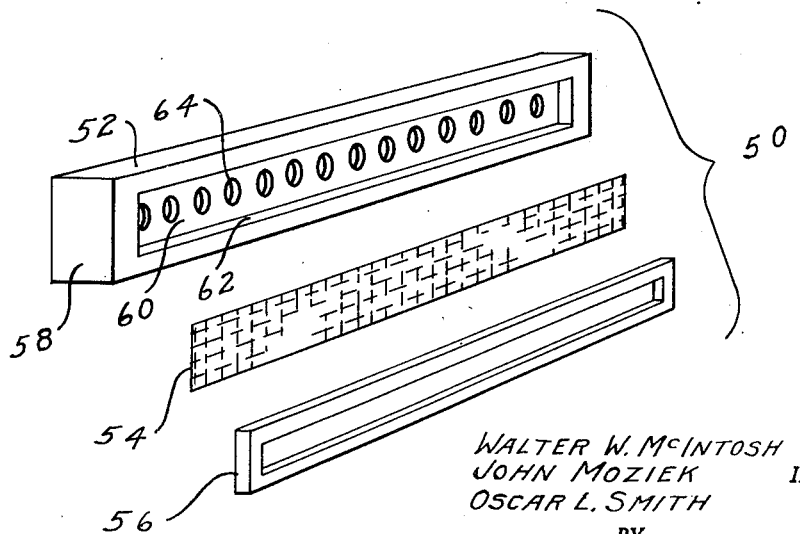
Fig. 3 is an exploded perspective rear view of a preferred form of straining assembly to be used in the extruder shown in Figs. 1 and 2.

As shown more clearly in Fig. 3, a preferred embodiment of the breaker-plate assembly 50 for use in the illustrated extruder comprises a breaker-plate 52, a screen 54 and a retainer 56. The breaker-plate 52 is of a special construction and comprises an imperforate marginal portion 58 and a perforate portion 60 provided with openings 64, the central portion 60 being of a shape to completely fill the portion of the chamber 22 intersected thereby. The provision of a marginal portion 58 will substantially completely prevent thermoplastic material from flowing through the slot 70 during continuous extrusion operations.

If desired, the breaker-plate 52 may be used alone, in which case the build up of back-pressure will be determined by the size of the openings therein. However, it is preferable to use one or more screens in conjunction with the breaker-plate 52 in order to more easily regulate back-pressure and more efficiently screen impurities from the thermoplastic material being extruded.

When screens are to be used, it is preferable to provide a recess 62 in the rear face of the breaker-plate 52 in which the screens may be placed. As is more clearly shown in Figs. 1 and 3, the recess 62 is preferably slightly larger than but of a configuration generally similar to the cross-sectional configuration of the portion of the chamber 22 intersected by the slot 70 and is provided with the openings 64 referred to above. The screens 54 should preferably have the shape of the recess 62. Only one screen 54 has been shown but a plurality of such screens could be used if desired. The screen 54 should be of a mesh to provide for the build-up of the desired back-pressure within the chamber 22. A suitable retainer 56 in the recess 62 is used to fix the screen 54 in place, the retainer 56 snugly engaging the wall of the recess 62 without blocking the perforate portion 60.

When the length of the breaker-plate assembly 50 is less than the length of the slot 70, as shown in the drawings, it is preferable to provide a pair of end plates 80 for centering the breaker-plate assembly 50 in the chamber 22. For this purpose, each of the end plates 80 is provided with a projection 82 adapted to fit within the slot 70 and abut one end of the breaker-plate assembly 50. Preferably, the projections 82 are of equal length and of a length such that the combined length of the projections 82 and the breaker-plate assembly 50 is equal to the length of the slot 70. The end plates 80 are secured to the wall 20 of the head 18 by any suitable means such as bolts 84 threaded in taps 86 in the sides of the flange 46.

Operation

Prior to the commencement of extrusion operations, the breaker-plate assembly 50 is positioned in the slot 70 and centered by means of the projections 82 of the end plates 80. The heating coil 16 is then energized and the screw 14 is rotated. When the desired temperature has been reached, thermoplastic material is continuously fed to the bore 12 of the extruder by any suitable means (not shown) and is forced therethrough by means of the screw 14. While in the bore 12, the thermoplastic material is heated to a plastic condition, colloided, and blended with such additives as may be present. The colloided thermoplastic material is forced through the breaker-plate assembly 50, passing first through the screen 54 and then through the openings 64 of the breaker-plate 52. As has been indicated, the resistance offered by the breaker-plate 52 and the screen 54 will increase the back-pressure in the chamber 22 and the bore 12. After passage through the breaker-plate assembly 50, the thermoplastic material is forced through the openings 40 of the die 30.

Impurities and uncolloided agglomerates of thermoplastic material will be retained by the screen 54 and, as a result, the breaker-plate assembly 50 may become clogged as extrusion operations continue. When this happens, it is necessary that the clogged breaker-plate assembly 50 be replaced. In accordance with the present invention, this is done without interrupting continuous extrusion operations.

While thermoplastic material is being extruded, the bolts 84 are released and the end plates 80 are removed. A fresh breaker-plate assembly (not shown) of the same construction as the illustrated assembly 50 is then positioned within one end of the slot 70 and brought into abutting contact with one end of the clogged assembly 50. Force is then applied to the fresh assembly by any suitable means (not shown) in order to progressively push the fresh assembly into the slot 70 and force the clogged assembly 50 from the chamber 22 and out the other end of the slot 70. It is preferable that the replacement operation be performed at a rate such that each increment of the fresh assembly is heated to the temperature of the thermoplastic material within the chamber 22 before being forced therein. For this reason, the replacement operation will normally require several minutes. However, there will be substantially no flow of thermoplastic material out the ends of the slot 70 during this time and once the fresh assembly is properly centered in the slot 70, flow into the slot 70 will be nil. When the fresh assembly is in the slot 70, the end plates 80 are again attached to the wall 20 by means of the bolts 84 in order to properly center the assembly. As a result, the clogged assembly 50 will have been replaced without interrupting continuous extrusion operations.

Occasionally, a batch of off-grade material may be fed to the extruder. Since the extruder will have been set to extrude in-grade material, it will frequently happen that the off-grade material will be improperly colloided. Generally, such material must be discarded as it is impractical to interrupt continuous extrusion operations in order to modify the design of the extruder. However, in accordance with the present invention, it is frequently possible to quickly and satisfactorily remedy this situation by either increasing or decreasing back-pressure, as the case may be, without interrupting continuous extrusion operations. In order to do this, a special strainer assembly designed to effect the desired change in back-pressure is prepared by mounting on the breaker-plate 52 a screen of different mesh size, a different number of screens, or both. The standard breaker-plate assembly 50 is then replaced by the special strainer breaker-plate assembly in the indicated manner without interrupting extrusion operations. As a result of the change in breaker-plate assemblies, the off-grade material can be satisfactorily colloided and need not be discarded. When the off-grade material has passed through the extruder and the extrusion of the standard formulation is resumed, the special breaker-plate assembly is replaced by the standard breaker-plate assembly for the regular formulation.

What is claimed is:

1. In combination in an extruder, an elongated casing defining a lengthwise bore therein, a rotatable screw mounted within said bore, a transverse slot of uniform cross section in the elongated casing between the end of the screw and the discharge end of the casing, said slot intersecting the entire peripheral edge of the bore, a sealably fitting breaker plate assembly slideably mounted in said slot, the length of the breaker plate assembly being less than that of the slot, but sufficient to completely intersect the peripheral edge of the bore, said breaker plate assembly having an imperforate marginal portion and a central perforate portion whose cross-sectional area is substantially coextensive with the bore, and removable stop means in the slot against which the breaker plate assembly abuts to align the perforate portion thereof with the bore.

2. In combination in an extruder, an elongated casing defining a lengthwise bore of initially circular cross-section and of terminally rectangular cross-section, a rotatable screw mounted within said bore, a transverse slot of substantially rectangular cross-section in the elongated casing between the end of the screw and the discharge end of the casing, said slot intersecting the entire peripheral edge of the bore, a sealably fitting breaker plate assembly slideably mounted in said slot, the length of the breaker plate assembly being less than that of the slot, but greater than the peripheral length of the bore, said breaker plate assembly having an imperforate marginal portion and a central perforate portion whose cross-sectional area is substantially co-extensive with the bore, and removable stop means in the slot against which the breaker plate assembly abuts to align the perforate portion thereof with the bore.

3. An extruder as in claim 1 in which the removal stop means consists of a pair of closure members covering the ends of the slot and engaging the ends of the breaker-plate assembly for centering same in the slot.

4. An extruder as in claim 2 wherein the breaker-plate assembly comprises a breaker-plate and a screen, said breaker-plate comprising an imperforate marginal portion and a rearwardly-facing recessed central perforate portion, said screen having the shape of said recess and being fixed therein.

References Cited in the file of this patent

UNITED STATES PATENTS

| 635,026 | Saunders | Oct. 17, 1899 |
| 1,931,872 | Lodge | Oct. 24, 1933 |
| 2,661,497 | Birmingham | Dec. 8, 1953 |

FOREIGN PATENTS

| 774,212 | France | Dec. 3, 1934 |